(No Model.)
3 Sheets—Sheet 1.
M. V. SMITH.
FURNACE FOR MELTING GLASS, &c.
No. 280,872. Patented July 10, 1883.
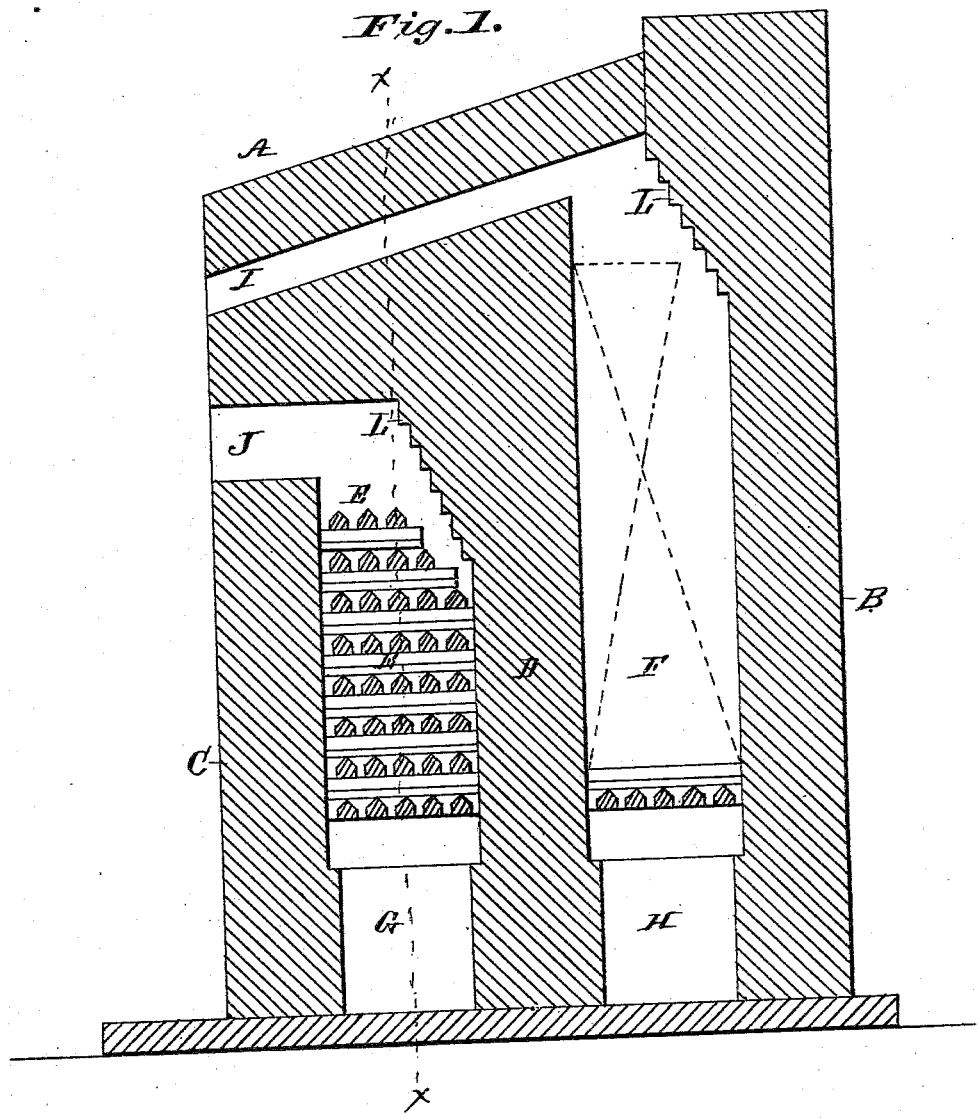
Witnesses:
J. C. Brecht
D. T. Caldwell
Inventor:
Martin V. Smith

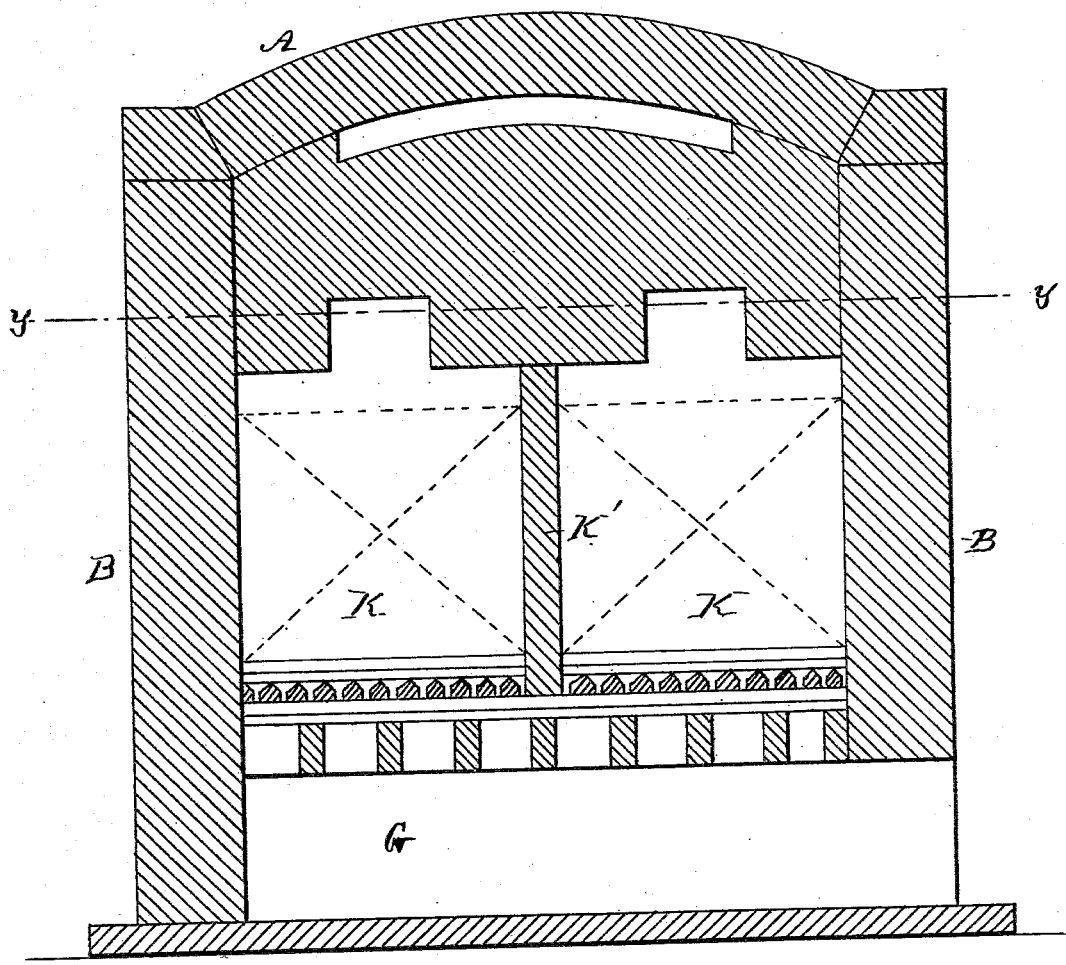

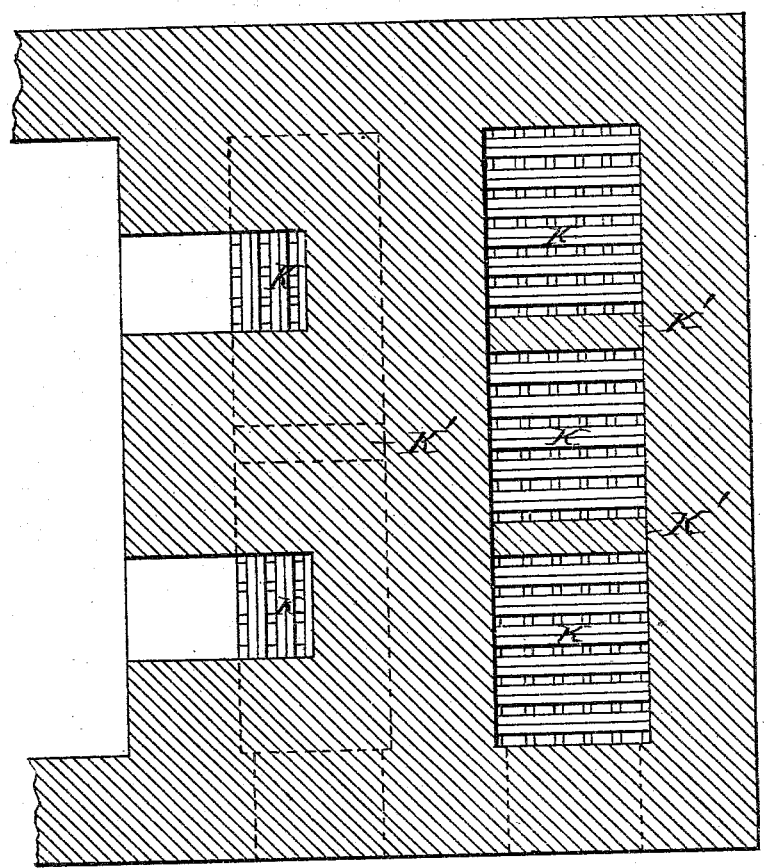

UNITED STATES PATENT OFFICE.

MARTIN V. SMITH, OF TYRONE, PENNSYLVANIA.

FURNACE FOR MELTING GLASS, &c.

SPECIFICATION forming part of Letters Patent No. 280,872, dated July 10, 1883.

Application filed May 21, 1883. (No model.)

*To all whom it may concern:*

Be it known that I, MARTIN V. SMITH, a citizen of the United States, residing at Tyrone, in the county of Blair and State of Pennsylvania, have invented certain new and useful Improvements in Regenerator-Furnaces for Melting Glass and Metals; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 1 is a longitudinal sectional view of the checker-work and air and gas flues. Fig. 2 is a cross-sectional view on the line $x\ x$ of Fig. 1. Fig. 3 is a top or plan view on the line $y\ y$ of Fig. 2.

My invention relates to improvements in that class of furnaces known as "regenerative gas-furnaces," for the melting of glass or metal, and for melting or heating other substances requiring an intense heat, and is more especially designed as an improvement on the furnace for which Letters Patent were granted to me November 7, 1882, No. 267,116. My present invention may, however, be applied to all regenerative furnaces with good results in controlling the gases and waste products of combustion which have passed through the furnace and directing them in straight lines through the "checker-work" to the flues below, so that the checker-work will be heated uniformly and produce a better heating result on the reversal of the draft which carries the gas and air up through the regenerator-pile into the furnace, where the melting is done, and where the most intense heat is required; and to this end my invention consists in dividing up the regenerative compartments, which contain the pile or checker-work of fire-brick, into compartments by means of partition walls or diaphragms of fire-brick or other suitable refractory or fire-resisting material, so that when the gases and waste products of combustion which have passed through the furnace strike the regenerative pile or checker-work they will be drawn by the draft in the lower flues through the checker-work in straight lines, thus preventing one portion of the checker-work from becoming hotter than the other portions, and also preventing one portion from being burned out or destroyed before the other portions are injured to any great extent, while at the same time the regenerative pile or checker-work is heated uniformly, and better results in the combustion of the gases are produced when the draft is reversed.

My invention consists, further, in strengthening or making the back walls of the regenerative flues thicker at the point where the products of combustion are deflected downward as they come from the furnace proper, so that there is more material to meet and resist the cutting and wearing action of the waste gases on their way to the regenerator.

I will now proceed to describe the construction of my furnace, reference being had to the accompanying drawings, in which I have shown only one set of regenerators, it being understood that in furnaces of this class two regenerators are used—one at each end or side of the furnace—of like construction and operation.

A is a continuation of the top or roof of the combustion or melting chamber, (not shown,) and B the end and side walls which support the same.

C is a back wall, and D a party or division wall, composed of fire-brick, which separates the gas-regenerator E from the air-regenerator F, the general construction of which is substantially the same as shown and described in my patent heretofore referred to. These regenerators E and F communicate at the bottom with the gas-channel G and air-channel H, and at their upper ends with the melting or combustion chamber through the flues I J. The regenerators E and F are divided into two or more compartments, K, by means of partition-walls or diaphragms K′, made of fire-brick or other refractory material placed crosswise therein, the object of which is to cause the waste gases and products of combustion to pass through the checker-work to the bottom before entering the channels G and H, and thus prevent the gases and products of combustion from passing diagonally through the checker-work toward the channels by the force of the draft in said channels.

In this class of furnaces as now constructed, the tendency of the gases and products of combustion which come over from the heating and melting chamber is to take the shortest route through the regenerators, which, without the use of the diaphragms or party-walls, is in a diagonal direction through the checker-work, thus heating only about two-thirds of the checker-work, and wearing out or destroying these parts of the checker-work before the other portion is injured to any appreciable extent, whereas by the use of the party-walls the checker-work is heated uniformly, and much better results in making a melt are secured, while the disintegration or wearing out of the fire-brick which compose the checker-work of the regenerators by the action of the intense heat is more evenly distributed and the life of the furnace prolonged. At the top of the regenerator F the wall B is strengthened or enlarged, as shown at L, by setting the bricks which compose the wall so as to project from the perpendicular face of the wall. The top portion of the wall D is also constructed in like manner, the object of which is to give a greater body of material at this point, against which the gases and products of combustion expend their force in their passage from the melting or heating compartment to the regenerators, and offers a greater resistance to the cutting action of said gases, thus prolonging the time in which the furnace can be used without repairs or rebuilding. Another advantage I have in building the walls of the regenerators larger or thicker at the top is that I have a larger bearing-surface for the tile which cover the checker-work and which form ports for the gas to properly enter the furnace.

The trouble ordinarily with the tiles used in covering the checker-work is that they are so large that they fall or sink of their own weight when subjected to intense heat, and the furnace must needs be stopped to repair the damage caused thereby. This trouble is obviated to a great degree by my construction, as it enables me to use smaller tiles, and at the same time gives said tiles a broad, firm bearing.

Owing to the exorbitant outlay of time and money in the construction of furnaces of this kind, it is very important that they be constructed on a plan which will give the greatest number of melts. I have found by actual tests that my furnace will last longer under the same tests and give better satisfaction than furnaces constructed on any other plan known to me.

I am aware that slabs have been fixed over the vertical gas and air passages, so as to deflect and intermix the gases and insure perfect combustion.

Having thus described my invention, what I claim, and desire to secure by Letters Patent, is—

1. A regenerative furnace the regenerator-chambers of which are divided into compartments by means of one or more walls, partitions, or diaphragms placed crosswise therein, whereby the waste gases and products of combustion are directed in straight lines through the checker-work, as set forth.

2. In a regenerative furnace of the character described, the regenerative compartments E and F, provided with a checker-work of fire-brick, in combination with the walls, partitions, or diaphragms K, as and for the purpose set forth.

3. A regenerative furnace having the walls of the gas and air flues made thicker at their upper ends or at the point where the gases and products of combustion are deflected downward as they come from the melting-furnace, as and for the purpose set forth.

4. A regenerative furnace having the walls of the gas-flue made thicker at their upper ends, so as to provide a broad bearing for the tiles which form the gas-ports, as set forth.

In testimony whereof I have hereunto set my hand this 8th day of May, 1883.

MARTIN V. SMITH.

Witnesses:
MARK S. FOOTE,
D. T. CALDWELL.